US011909658B2

(12) United States Patent
Shibata et al.

(10) Patent No.: US 11,909,658 B2
(45) Date of Patent: Feb. 20, 2024

(54) SIGNAL TRANSFER SYSTEM, PATH CONTROL DEVICE, AND SIGNAL TRANSFER METHOD

(71) Applicant: NIPPON TELEGRAPH AND TELEPHONE CORPORATION, Tokyo (JP)

(72) Inventors: Naotaka Shibata, Musashino (JP); Hiroyuki Uzawa, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1 day.

(21) Appl. No.: 17/634,197

(22) PCT Filed: Aug. 19, 2019

(86) PCT No.: PCT/JP2019/032285
§ 371 (c)(1),
(2) Date: Feb. 9, 2022

(87) PCT Pub. No.: WO2021/033237
PCT Pub. Date: Feb. 25, 2021

(65) Prior Publication Data
US 2022/0294742 A1    Sep. 15, 2022

(51) Int. Cl.
*H04L 47/283*    (2022.01)
*H04L 45/24*    (2022.01)
(Continued)

(52) U.S. Cl.
CPC ........... *H04L 47/283* (2013.01); *H04L 45/24* (2013.01); *H04L 47/24* (2013.01); *H04L 47/6215* (2013.01); *H04L 49/205* (2013.01)

(58) Field of Classification Search
CPC ... H04L 47/283; H04L 47/24; H04L 47/6215; H04L 45/24; H04L 49/205
See application file for complete search history.

(56) References Cited

U.S. PATENT DOCUMENTS

2022/0124043 A1*    4/2022    Zhu ..................... H04L 47/2483

FOREIGN PATENT DOCUMENTS

JP    2018129661 A    8/2018
JP    20194379 A    1/2019

OTHER PUBLICATIONS

IEEE Standards Association, "IEEE Standard for Local and metropolitan area networks—Time-Sensitive Networking for Fronthaul", IEEE Std 802.1CM-2018, Jun. 8, 2018.

* cited by examiner

*Primary Examiner* — Azizul Choudhury
(74) *Attorney, Agent, or Firm* — Harness, Dickey & Pierce, P.L.C.

(57) ABSTRACT

A path control device controls a plurality of paths for transmitting signals through a network including a plurality of signal transfer devices that transfer signals while switching a first transmission period during which high-priority traffic can be transmitted and a second transmission period during which low-priority traffic can be transmitted. The path control device includes: a calculation unit that calculates a plurality of paths through which signals are transferred, based on network configuration information indicating a configuration of the network; an estimation unit that estimates paths for low-priority traffic so as to increase the number of low-priority traffic flows to be transferred during a predetermined period through the plurality of paths calculated by the calculation unit, in a case in which the plurality of signal transfer devices detect an end of high priority traffic in the first transmission period, in accordance (Continued)

with statistical values in the second transmission period based on a transmission schedule made to change the first transmission period after the end of high-priority traffic to the second transmission period; and a determination unit that determines, for each of the plurality of signal transfer devices, output destination setting information such that the paths estimated by the estimation unit are set to an output destination of low-priority traffic.

8 Claims, 10 Drawing Sheets

(51) Int. Cl.
      *H04L 47/24*       (2022.01)
      *H04L 47/62*       (2022.01)
      *H04L 49/20*       (2022.01)

SIGNAL TRANSFER SYSTEM, PATH CONTROL DEVICE, AND SIGNAL TRANSFER METHOD

CROSS-REFERENCE TO RELATED APPLICATIONS

This application is a 371 U.S. National Phase of International Application No. PCT/JP2019/032285 filed on Aug. 19, 2019. The entire disclosure of the above application is incorporated herein by reference.

TECHNICAL FIELD

The present invention relates to a signal transfer system, a path control device, and a signal transfer method.

BACKGROUND ART

A cellular system can have a configuration in which a configuration of a base station is disposed to be separated into a wireless control device and a wireless device. At this time, the wireless control device and the wireless device are connected to each other through an optical section including an optical device and an optical fiber. The optical section including the optical device and the optical fiber is referred to as a mobile fronthaul (MFH).

Although point-to-point connection has been used in an MFH in the related art, networking is also being considered in order to achieve cost reduction of the MFH. Examples of the networking include wavelength division multiplexing (WDM), a time division multiplexing-passive optical network (TDM-PON) using time division multiplexing, and a configuration in which layer-2 switches (L2SWs) are connected in multiple stages (see NPL 1).

Particularly, a network system in which layer-2 switches that are signal transfer devices are connected in multiple stages (hereinafter, referred to as an "L2NW") is considered to have higher reliability as compared with other network systems since a plurality of paths can be used.

On the other hand, a low latency is required in a mobile fronthaul. Thus, standardization of a time sensitive network (TSN) has advanced for the purpose of accommodating traffic with such strict latency requirements, and applications thereof have been studied (see PTL 1 and PTL 2).

A time aware shaper (TAS) studied in TSN is a scheme that is particularly effective in a case in which traffic with high priority has periodicity, traffic scheduling is performed for each priority, and communication availability is switched.

Specifically, operations of transferring only high-priority traffic and not transferring low-priority traffic in a period during which the high-priority traffic arrives at a switch (SW) and transferring the low-priority traffic in a period during which the high-priority traffic does not come are periodically repeated. It is thus possible to transfer the high-priority traffic without waiting for transferring traffic with other priorities, and it is suitable for latency reduction.

CITATION LIST

Patent Literature

PTL 1: JP 2018-129661 A
PTL 2: JP 2019-004379 A

Non Patent Literature

NPL 1: "IEEE Standard for Local and metropolitan area networks-Time-Sensitive Networking for Fronthaul," IEEE Standards Association, 2018

SUMMARY OF THE INVENTION

Technical Problem

As low-priority traffic, Internet of Things (IoT) is conceivable. Because the IoT typically has larger required latency than an MFH, there is considered to be no problem if the IoT is handled as low-priority traffic in TAS control.

On the other hand, a user datagram protocol (UDP) is used in many IoT applications, such as a security camera. In this case, a constant amount of traffic flows regardless of time, so even if a band is temporarily expanded, a throughput does not increase, and there is no advantage.

In a case in which a stable and constant amount of band is required as in the UDP, it is desirable to increase the number of low-priority traffic flows that can be accommodated in terms of accommodation efficiency. However, since it is not known how much a low-priority signal communication available section is temporarily expanded, the number of flows that can be added is not known.

An object of the present invention is to provide a signal transfer system, a path control device, and a signal transfer method that are capable of increasing the number of flows that can be accommodated even for low-priority traffic that requires a stable and constant amount of band.

Means for Solving the Problem

A signal transfer system according to an aspect of the present invention includes: a plurality of signal transfer devices configured to transfer signals while switching a first transmission period during which high-priority traffic is transmitted and a second transmission period during which low-priority traffic is transmitted; and a path control device configured to control a plurality of paths through which the signals are transferred via the plurality of signal transfer devices. The plurality of signal transfer devices each include: a detection unit configured to detect an end of the high-priority traffic in the first transmission period; a scheduler unit, in a case in which the detection unit detects the end of the high-priority traffic, configured to make a transmission schedule to change the first transmission period after the end of the high-priority traffic to the second transmission period; a measurement unit configured to measure statistical values in the second transmission period based on the transmission schedule made by the scheduler unit; a communication unit configured to send the statistical values to the path control device; and an output unit configured to output the low-priority traffic based on output destination setting information. The path control device includes: a calculation unit configured to calculate the plurality of paths through which signals are transferred, based on network configuration information indicating a configuration of a network to which the plurality of signal transfer devices and the path control device are connected; an estimation unit configured to estimate the second transmission period in the plurality of paths calculated by the calculation unit, based on the statistical values sent from the signal transfer device, determine the number of low-priority traffic flows to be accommodated, and determine or change each path for the low-priority traffic at a shorter cycle than a cycle at which the number of low-priority traffic flows is determined; and a determination unit configured to determine, for each of the plurality of signal transfer devices, the output destination setting information such that the path determined or changed by the estimation unit is set to an output destination of the low-priority traffic.

Further, in a path control device according to an aspect of the invention configured to control a plurality of paths for transmitting signals through a network including a plurality of signal transfer devices, each of which being configured to transfer signals while switching a first transmission period during which high-priority traffic is transmitted and a second transmission period during which low-priority traffic is transmitted, the path control device includes: a calculation unit configured to calculate the plurality of paths through which signals are transferred, based on network configuration information indicating a configuration of the network; an estimation unit, in a case in which the signal transfer device detects an end of high-priority traffic in the first transmission period, in accordance with statistical values in the second transmission period based on a transmission schedule made for changing the first transmission period after the end of the high-priority traffic to the second transmission period, configured to estimate the second transmission period in the plurality of paths calculated by the calculation unit, determine the number of low-priority traffic flows to be accommodated, and determine or change the path for low-priority traffic at a shorter cycle than a cycle at which the number of low-priority traffic flows is determined; and a determination unit configured to determine, for each of the plurality of signal transfer devices, output destination setting information such that the plurality of paths estimated by the estimation unit are set to an output destination of low-priority traffic.

Further, a signal transfer method according to an aspect of the present invention performed by a signal transfer system including a plurality of signal transfer devices configured to transfer signals while switching a first transmission period during which high-priority traffic is transmitted and a second transmission period during which low-priority traffic is transmitted; and a path control device configured to control a plurality of paths that transfer signals via the plurality of signal transfer devices. The method includes: detecting an end of high-priority traffic in the first transmission period; in a case in which the end of high-priority traffic is detected, making a transmission schedule to change the first transmission period after the end of high-priority traffic to the second transmission period; measuring statistical values in the second transmission period based on the transmission schedule; calculating the plurality of paths through which signals are transferred, based on network configuration information indicating a configuration of a network to which the plurality of signal transfer devices and the path control device are connected; estimating the second transmission period in the plurality of paths calculated, based on the statistical values sent from the plurality of signal transfer devices, determining the number of low-priority traffic flows to be accommodated, and determining or changing the plurality of paths for low-priority traffic at a shorter cycle than a cycle at which the number of low-priority traffic flows is determined; determining, for each of the plurality of signal transfer devices, output destination setting information such that the plurality of paths estimated are set to an output destination of low-priority traffic; and outputting low-priority traffic based on the output destination setting information.

BRIEF DESCRIPTION OF DRAWINGS

FIG. 10($b$) is a timing chart illustrating, as an example, a state in which the low-priority signal communication available sections are extended after an end of high-priority traffic in the high-priority signal communication available sections.

DESCRIPTION OF EMBODIMENTS

First, the background to the present invention will be described. For example, as a signal transfer system including a plurality of signal transfer devices, there is a network that accommodates communication between a high-priority wireless device and a high-priority wireless control device and between a low-priority wireless device and a low-priority wireless control device and controls a plurality of signal transmission paths via the plurality of signal transfer devices using a path control device. First, such a network will be described.

Figure 6:
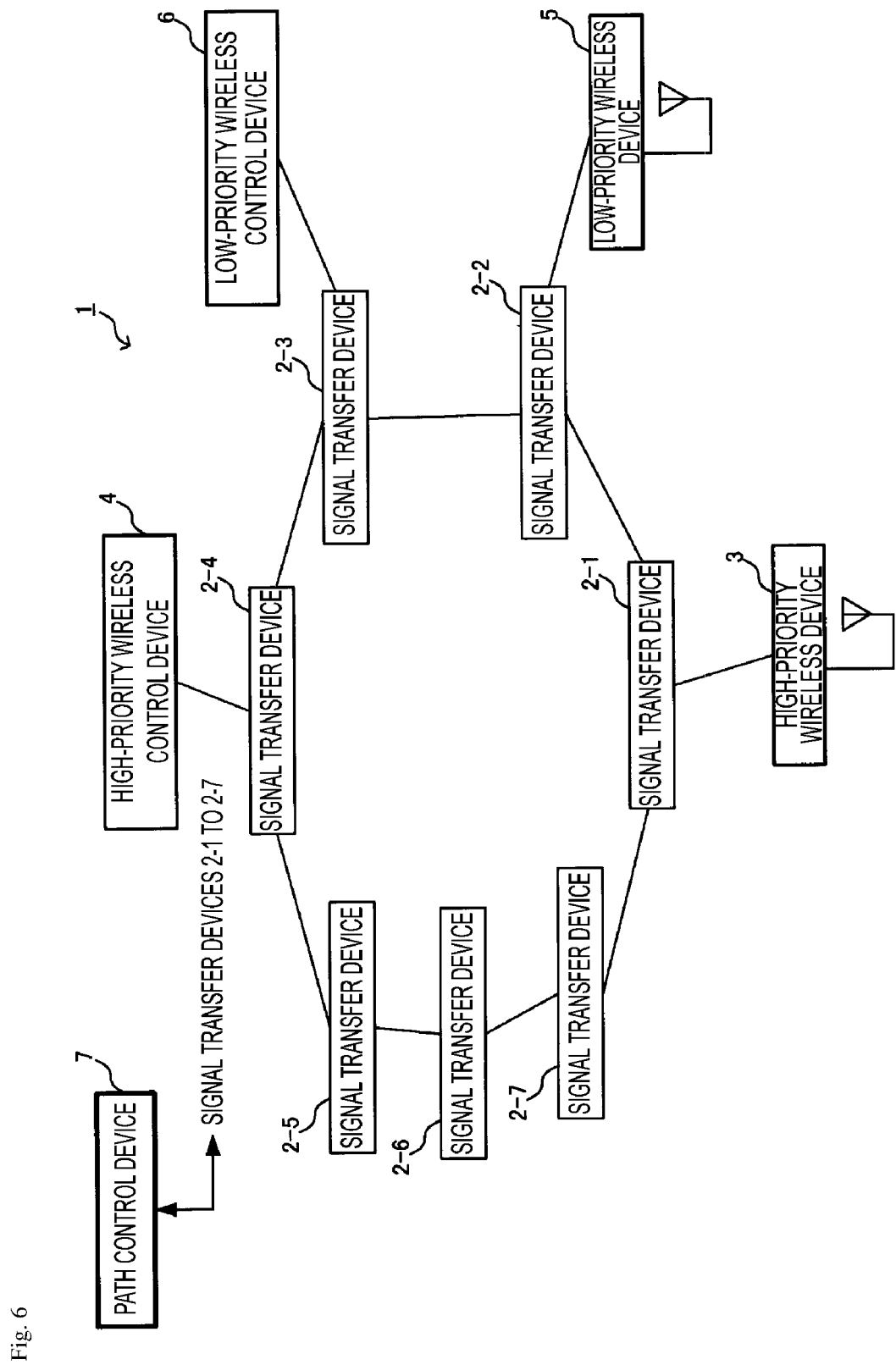
FIG. 6 is a diagram illustrating a configuration example of the signal transfer system.

FIG. 6 is a diagram illustrating a configuration example of a signal transfer system 1. The signal transfer system 1 has, for example, signal transfer devices 2-1 to 2-7, a high-priority wireless device 3, a high-priority wireless control device 4, a low-priority wireless device 5, a low-priority wireless control device 6, and a path control device 7.

The high-priority wireless device 3 and the high-priority wireless control device 4 transmit high-priority traffic. The low-priority wireless device 5 and the low-priority wireless control device 6 transmit low-priority traffic. The path control device 7 controls to determine transmission paths for the high-priority traffic and the low-priority traffic. At this time, a plurality of paths through which signals are transferred are present in the signal transfer system 1.

For example, the signal transfer devices 2-1 to 2-7 transfer signals sent by the high-priority wireless device 3 to the high-priority wireless control device 4 via the path determined by the path control device 7. Further, the signal transfer devices 2-1 to 2-7 transfer signals sent by the low-priority wireless device 5 to the low-priority wireless control device 6 via the path determined by the path control device 7.

Hereinafter, when any one of a plurality of configurations such as the signal transfer devices 2-1 to 2-7 is not specified, it will be simply abbreviated as a signal transfer device 2 or the like.

Figure 7:
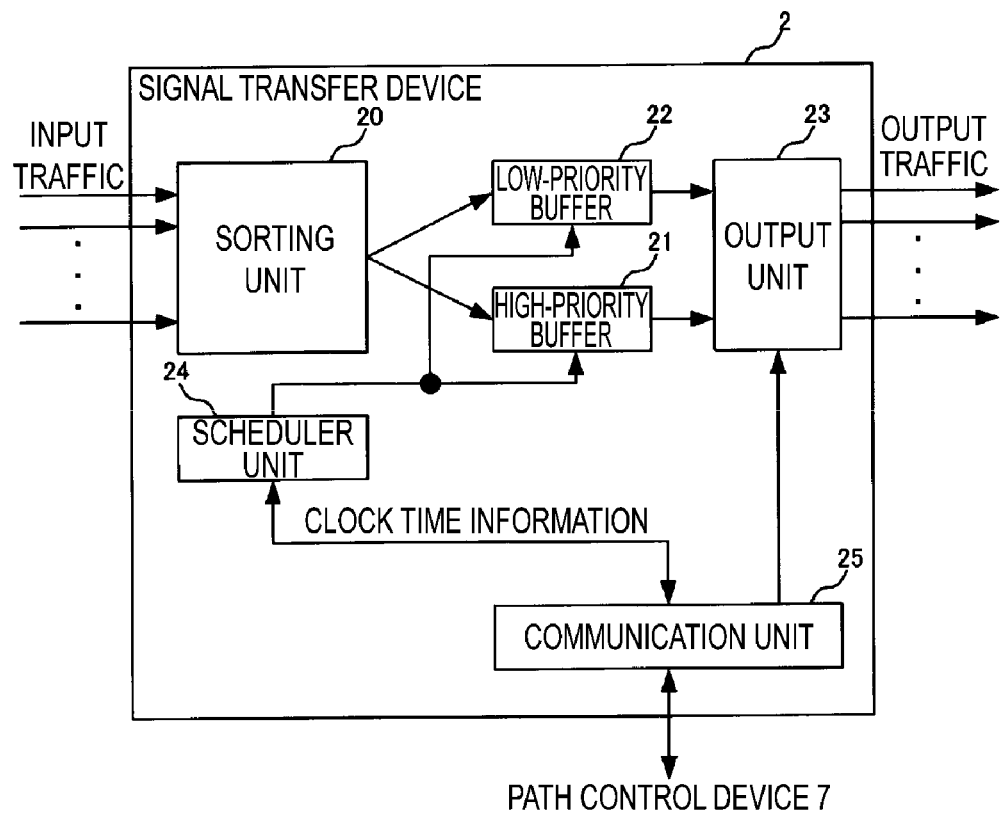
FIG. 7 is a diagram illustrating a configuration example of the signal transfer device in which a TAS function is mounted.

FIG. 7 is a diagram illustrating a configuration example of the signal transfer device 2 in which a TAS function is mounted. As illustrated in FIG. 7, the signal transfer device 2 includes a sorting unit 20, a high-priority buffer 21, a low-priority buffer 22, an output unit 23, a scheduler unit 24, and a communication unit 25.

The sorting unit 20 specifies whether traffic that has been input (input traffic) is high-priority frame or a low-priority frame and performs sorting to output the high-priority frame to the high-priority buffer 21 and output the low-priority frame to the low-priority buffer 22. The sorting unit 20 may use a virtual LAN identifier (VID) or may use a MAC address or an IP address to sort the frames.

The high-priority buffer 21 temporarily holds the high-priority frame and outputs the high-priority frame to the output unit 23 in response to a signal input from the scheduler unit 24.

The low-priority buffer 22 temporarily holds the low-priority frame and outputs the low-priority frame to the output unit 23 in response to a signal input from the scheduler unit 24.

The output unit 23 outputs the high-priority frame or the low-priority frame input from the high-priority buffer 21 or the low-priority buffer 22 as an output traffic to a transfer destination based on a signal (output destination setting information, which will be described later) input from the path control device 7 via the communication unit 25, for example.

The scheduler unit 24 issues an output command signal to the high-priority buffer 21 and issues an output stop command signal to the low-priority buffer 22, in a high-priority signal communication available section (first transmission period) in which the high-priority traffic can be transmitted, based on a signal (for example, clock time information) input from the path control device 7 via the communication unit 25, for example.

Further, the scheduler unit 24 issues an output command signal to the low-priority buffer 22 and issues an output stop command signal to the high-priority buffer 21, in a low-priority signal communication available section (second transmission period) in which the low-priority traffic can be transmitted, based on the clock time information.

The communication unit 25 sends and receives, to and from the path control device 7, control signals and the like other than traffic to be transferred. For example, the communication unit 25 receives the clock time information from the path control device 7 and outputs the clock time information to the scheduler unit 24. Further, the communication unit 25 receives output destination setting information, which will be described later, from the path control device 7 and outputs the output destination setting information to the output unit 23.

Figure 8:
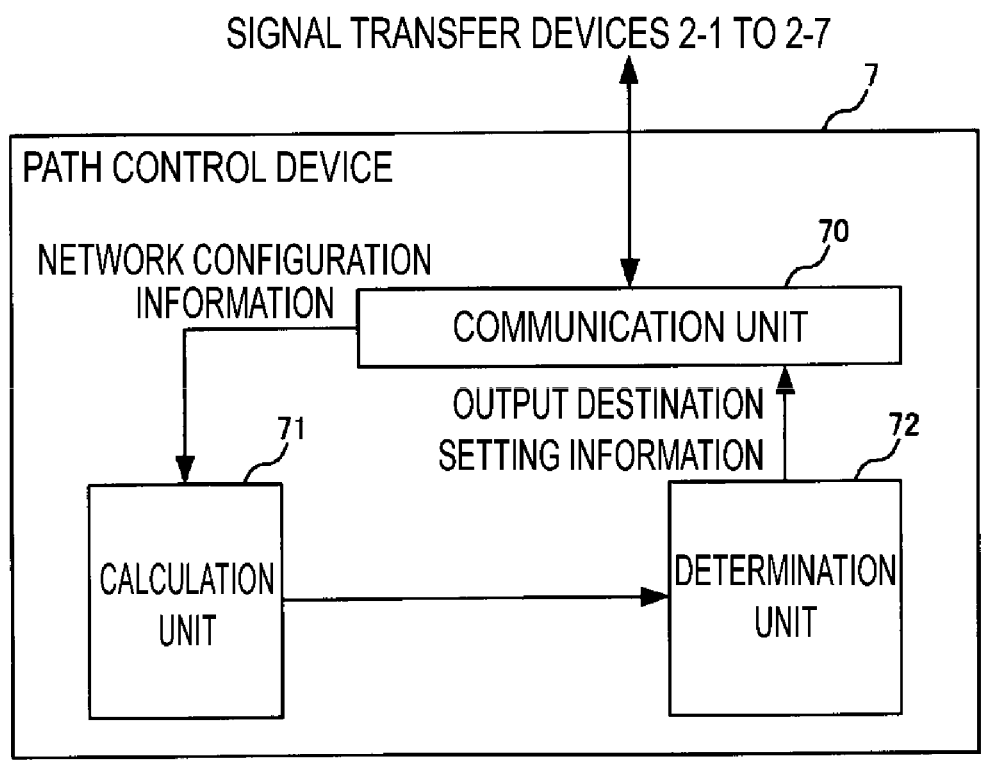
FIG. 8 is a diagram illustrating a configuration example of the path control device.

FIG. 8 is a diagram illustrating a configuration example of the path control device 7. As illustrated in FIG. 8, the path control device 7 has a communication unit 70, a calculation unit 71, and a determination unit 72.

The communication unit 70 sends and receives control signals and the like to and from the signal transfer devices 2-1 to 2-7. For example, the communication unit 70 receives information (network configuration information) regarding each unit configuring the signal transfer system 1 via the signal transfer devices 2-1 to 2-7 and outputs the information to the calculation unit 71. Further, the communication unit 70 sends the output destination setting information output by the determination unit 72, the clock time information, and the like to the signal transfer devices 2-1 to 2-7.

The calculation unit 71 calculates a plurality of signal transfer paths (path candidates) in the signal transfer system 1 based on the network configuration information input from the communication unit 70 and outputs the signal transfer paths to the determination unit 72.

The determination unit 72 determines the output destination setting information for setting an output destination of an output traffic for each of the signal transfer devices 2-1 to 2-7 based on the plurality of signal transfer paths calculated by the calculation unit 71 and outputs the output destination setting information to the communication unit 70. The output destination setting information is used to set a high-priority signal communication available section (first transmission period: $B_H$) in which high-priority traffic can be transmitted and a low-priority signal communication available section (second transmission period: $B_L$) in which low-priority traffic can be transmitted.

Figure 9:
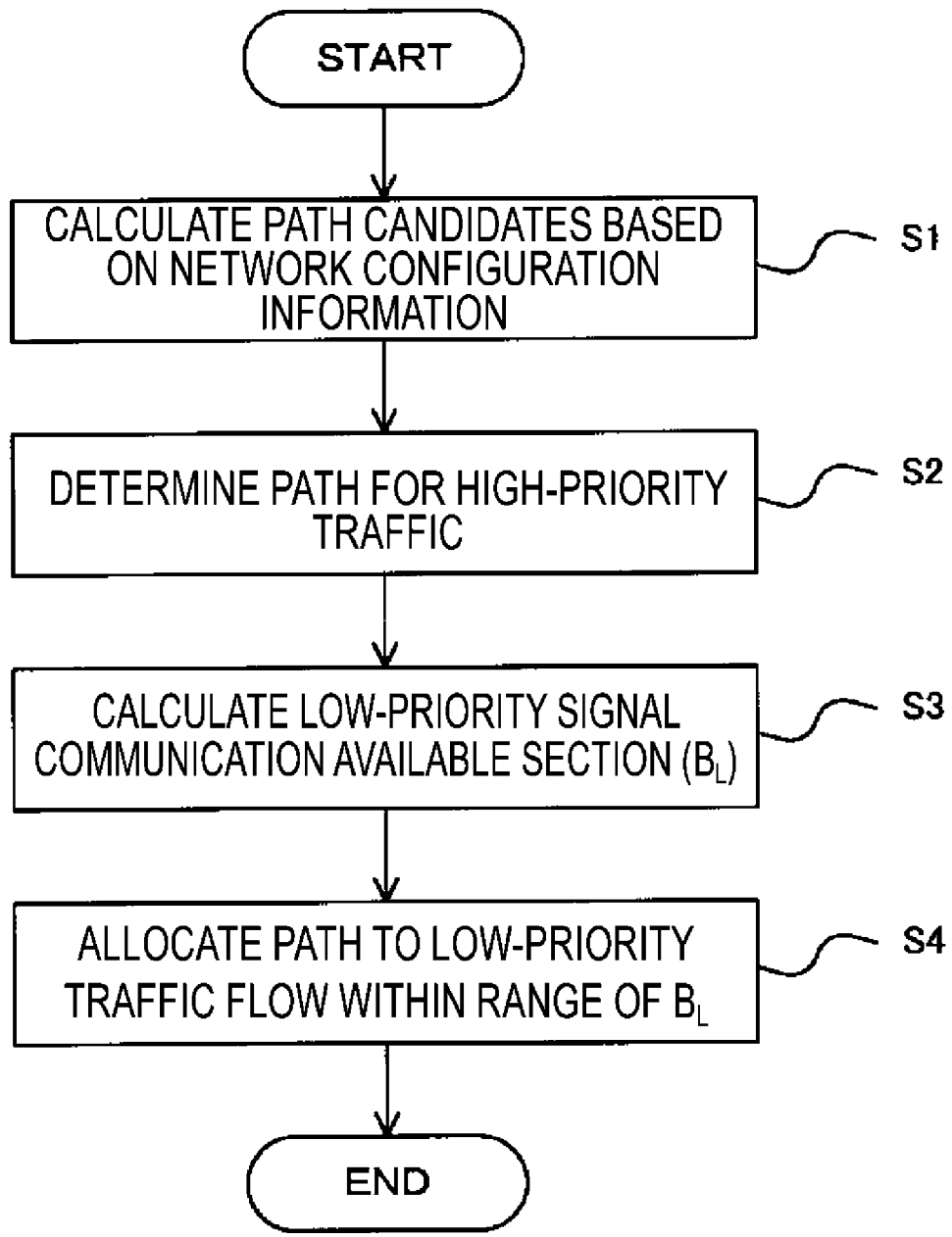
FIG. 9 is a flowchart illustrating processing for determining paths through which the signal transfer system transfers signals.

FIG. 9 is a flowchart illustrating processing for determining paths through which the signal transfer system 1 transfers signals. For example, in the path control device 7, the calculation unit 71 calculates path candidates the network configuration information (S1), and the determination unit 72 determines a path for high-priority traffic for each path (S2).

Next, in the path control device 7, the determination unit 72 calculates the low-priority signal communication available section ($B_L$) for each path (S3) and performs path allocation (path determination) to a low-priority traffic flow within a range of the low-priority signal communication available section ($B_L$) (S4).

In this manner, the path control device 7 performs calculation of the low-priority signal communication available section ($B_L$) for each path. For example, in a case in which an entire time zone is assumed to be 1, and 0.2 is booked as the high-priority signal communication available section ($B_H$), the low-priority signal communication available section ($B_L$) corresponds to 0.8. At this time, if it is assumed that an interface between the signal transfer devices 2 corresponds to 10 Gbps, it is possible to transmit low-priority traffic corresponding to 8 Gbps.

Figure 10:
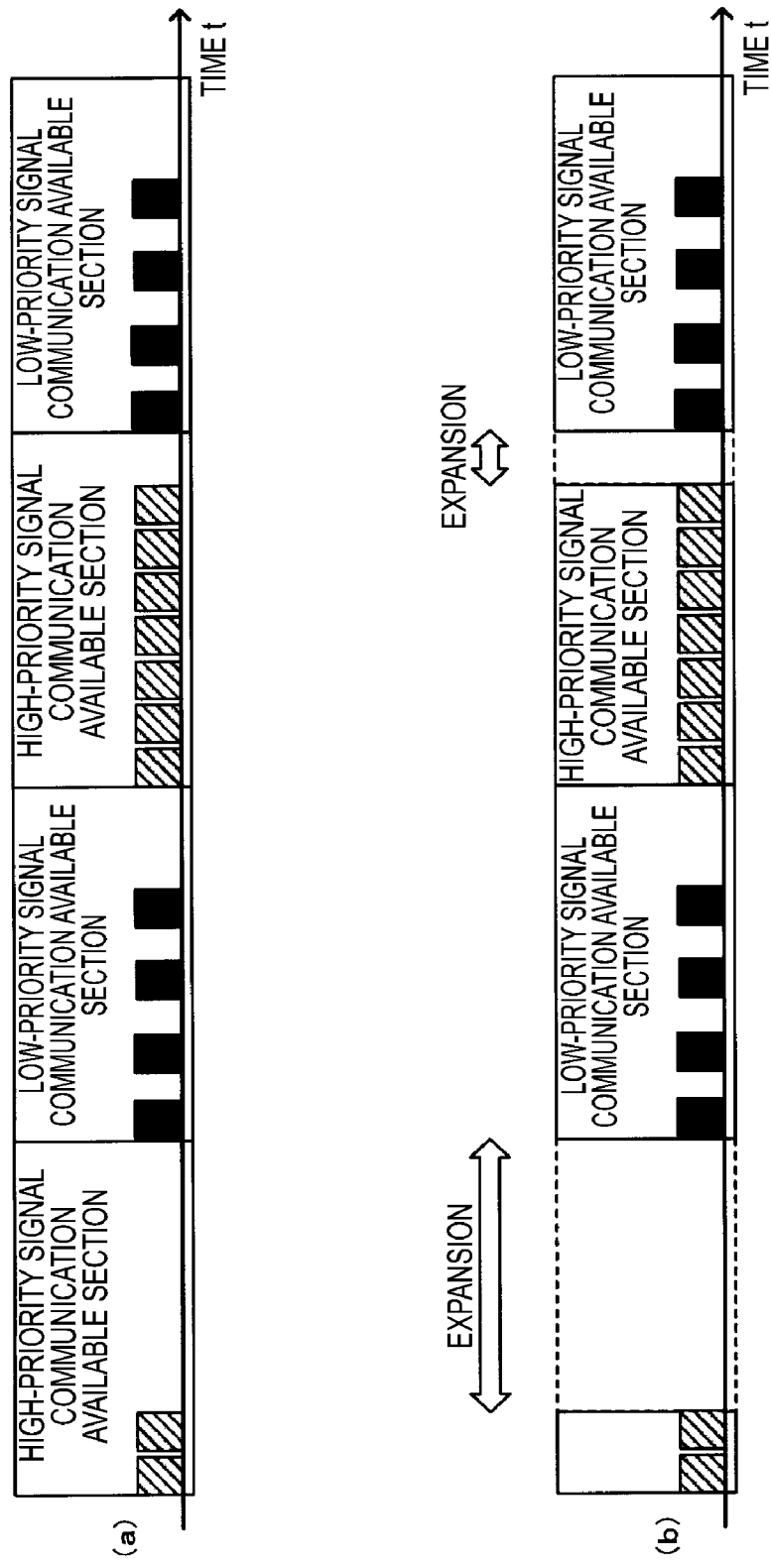
FIG. 10($a$) is a timing chart illustrating, as an example, a state in which high-priority signal communication available sections and low-priority signal communication available sections are fixed.

FIG. 10 is a timing chart illustrating an operation example of the TAS in the signal transfer system 1. FIG. 10(a) is a timing chart illustrating, as an example, a state in which the high-priority signal communication available sections ($B_H$) and the low-priority signal communication available sections ($B_L$) are fixed. FIG. 10(b) is a timing chart illustrating, as an example, a state in which the low-priority signal communication available sections ($B_L$) are extended after an end of the high-priority traffic in the high-priority signal communication available section ($B_H$).

As illustrated in FIG. 10(a), the high-priority signal communication available sections and the low-priority signal communication available sections occur alternately. Here, the high-priority traffic are transmitted in the high-priority signal communication available sections, and the low-priority traffic are transmitted in the low-priority signal communication available sections.

In this manner, the problem that the transmission of the high-priority traffic is delayed by transmitting the low-priority traffic is avoided. Further, it is assumed that mobile fronthaul traffic arrives in a bursting manner. Moreover, the amount of mobile fronthaul traffic varies every moment in accordance with a communication environment of a terminal.

Thus, no traffic flows in the latter half of a high-priority signal communication available section in a case in which the amount of high-priority traffic is small as illustrated in FIG. 10(*a*).

In the example illustrated in FIG. 10(*b*), in order to effectively use the high-priority signal communication available sections in a case in which the amount of high-priority traffic is small, when an end of the high-priority traffic is recognized, the high-priority signal communication available section is released to enable communication with low traffic.

In other words, after the end of the high-priority traffic is detected, the signal transfer devices 2-1 to 2-7 release the high-priority signal communication available sections, and allocate the released sections to a communication time for the low-priority signal.

In the operation illustrated in FIG. 10(*b*), the low-priority signal communication available sections are extended only in a case in which the amount of high-priority traffic is small. The extended band leads to latency reduction of the existing low-priority traffic flow and is thus effective in a case of using a protocol such as a transmission control protocol (TCP).

Next, a signal transfer system capable of increasing the number of flows that can be accommodated even for low-priority traffic that require a stable and constant amount of band.

Figure 1:
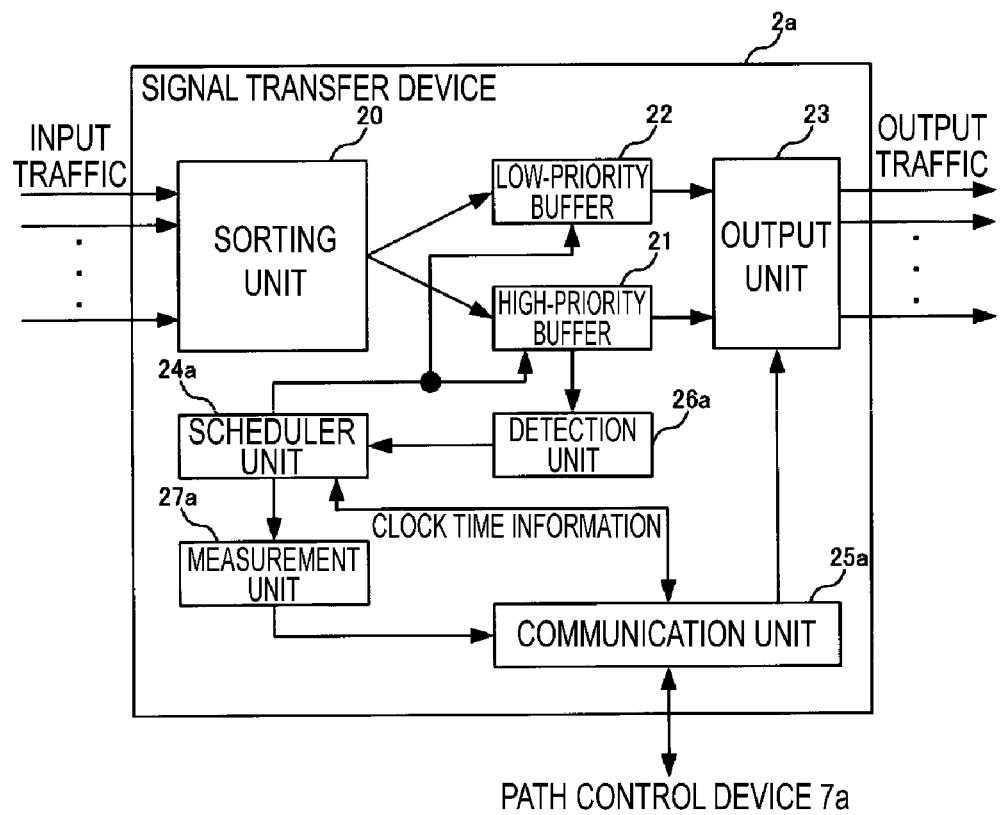
FIG. 1 is a diagram illustrating a configuration example of a signal transfer device according to an embodiment of the present invention.

FIG. 1 is a diagram illustrating a configuration example of a signal transfer device (signal transfer device 2*a*) according to an embodiment of the present invention. The signal transfer device 2*a* is substituted for each of the signal transfer devices 2-1 to 2-7 in the signal transfer system 1 illustrated in FIG. 6, for example, and forms a signal transfer system. At this time, the path control device 7 in the signal transfer system 1 illustrated in FIG. 6 is replaced with a path control device 7*a*, which will be described later using FIG. 2.

As illustrated in FIG. 1, the signal transfer device 2*a* has a sorting unit 20, a high-priority buffer 21, a low-priority buffer 22, an output unit 23, a detection unit 26*a*, a scheduler unit 24*a*, a measurement unit 27*a*, and a communication unit 25*a*. Note that in the signal transfer device 2*a* illustrated in FIG. 1, the same reference signs are applied to substantially the same configurations as those of the signal transfer device 2 illustrated in FIG. 7.

The detection unit 26*a* detects an end of high-priority traffic (such as completion of bursting of high-priority traffic) in a high-priority signal communication available section (first transmission period: $B_H$) in which the high-priority traffic can be transmitted and outputs the detection results to the scheduler unit 24*a*.

For example, the detection unit 26*a* determines that the high-priority traffic have ended when the detection unit 26*a* confirms that no next high-priority frame arrives even after a time that is equal to or greater than a predetermined threshold elapses from arrival of the last high-priority frame. Also, the detection unit 26*a* may determine the end of the high-priority traffic based on a special frame indicating the end of the high-priority traffic output by the signal transfer device 2 in a previous stage, for example.

The scheduler unit 24*a* makes a transmission schedule based on a signal (for example, clock time information) input from the path control device 7*a* via the communication unit 25*a*, for example, issues an output command signal to the high-priority buffer 21, and issues an output stop command signal to the low-priority buffer 22, in the high-priority signal communication available section (first transmission period) in which the high-priority traffic can be transmitted.

Further, the scheduler unit 24*a* makes a transmission schedule based on the clock time information, issues an output command signal to the low-priority buffer 22, and issues an output stop command signal to the high-priority buffer 21, in the low-priority signal communication available section (second transmission period) in which the low-priority traffic can be transmitted.

Further, when the detection unit 26*a* detects the end of the high-priority traffic, the scheduler unit 24*a* changes the transmission schedule to change the first transmission period after the end of the high-priority traffic to the second transmission period and outputs the transmission schedule to the measurement unit 27*a*. Further, when the detection unit 26*a* does not detect an end of the high-priority traffic, and the first transmission period determined based on a signal (for example, clock time information) input from the path control device 7*a* via the communication unit 25*a* ends, the scheduler unit 24*a* does not change the transmission schedule and outputs the transmission schedule to the measurement unit 27*a*.

The measurement unit 27*a* measures statistical values in the second transmission period based on the transmission schedule notified from the scheduler unit 24*a* and outputs the statistical values in the second transmission period to the communication unit 25*a*. The statistical values (statistical information) measured by the measurement unit 27*a* indicates at least one or more of an average value, a maximum value, a minimum value, and the like in the second transmission period.

Figure 2:
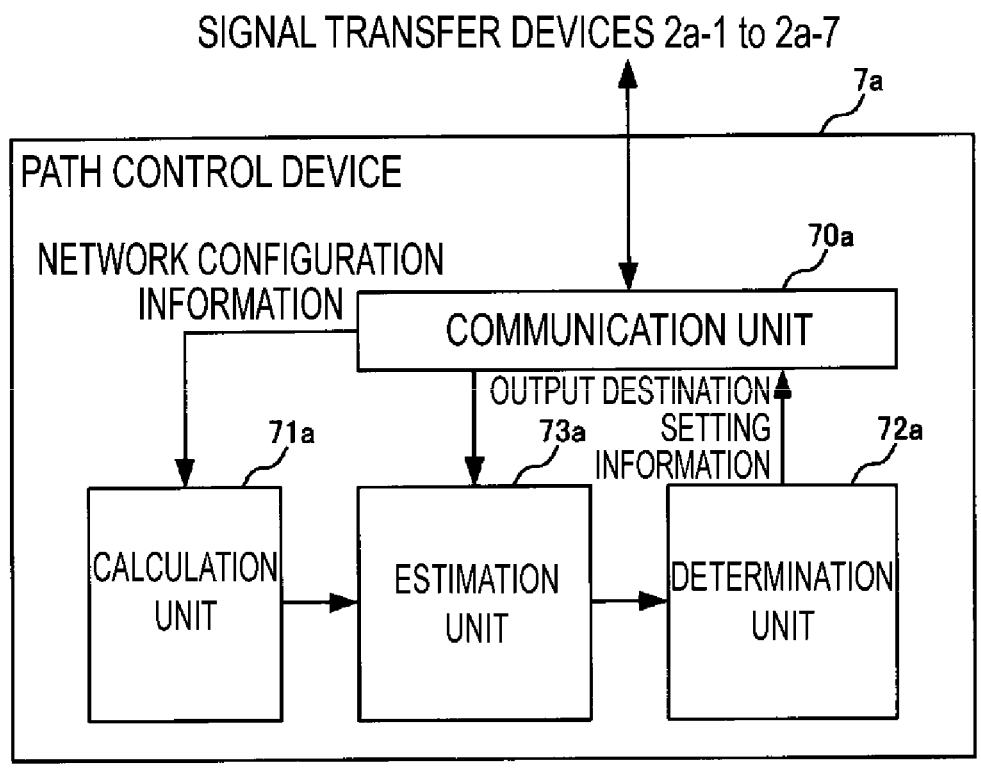
FIG. 2 is a diagram illustrating a configuration example of a path control device according to the embodiment.

The communication unit 25*a* sends and receives control signals and the like other than traffic to be transferred to and from the path control device 7*a* (see FIG. 2). For example, the communication unit 25*a* receives the clock time information from the path control device 7*a* and outputs the clock time information to the scheduler unit 24*a*. Further, the communication unit 25 receives output destination setting information, which will be described later, from the path control device 7*a* and outputs the output destination setting information to the output unit 23. Further, the communication unit 25*a* sends the statistical values in the second transmission period measured by the measurement unit 27*a* to the path control device 7*a*.

FIG. 2 is a diagram illustrating a configuration example of the path control device 7*a* according to an embodiment of the present invention. As illustrated in FIG. 2, the path control device 7*a* has a communication unit 70*a*, a calculation unit 71*a*, an estimation unit 73*a*, and a determination unit 72*a*.

The communication unit 70*a* sends and receives control signals and the like to and from each signal transfer device 2*a*. For example, the communication unit 70*a* receives information (network configuration information) of each unit forming the signal transfer system via the signal transfer device 2*a* and outputs the information to the calculation unit 71*a*. Further, the communication unit 70*a* receives statistical values in the second transmission period sent by each signal transfer device 2*a* and outputs the statistical values to the estimation unit 73*a*. Further, the communication unit 70*a* sends output destination setting information output by the determination unit 72*a*, clock time information, and the like to each signal transfer device 2*a*.

The calculation unit 71*a* calculates a plurality of signal transfer paths (path candidates) in the signal transfer system based on the network configuration information input from the communication unit 70*a* and outputs the signal transfer paths to the estimation unit 73a. For example, the calculation unit 71a may be configured to determine a path for high-priority traffic first and then output information indicating the determined paths for the high-priority traffic to the estimation unit 73a.

The estimation unit 73a estimates the number of low-priority traffic flows that can be accommodated based on each statistical value in the second transmission period sent by the signal transfer device 2a for the plurality of paths (path candidates) calculated by the calculation unit 71a.

For example, the estimation unit 73a estimates a low-priority signal communication available section ($B_1$, $B_{2,i}$) of the next cycle based on the low-priority signal communication available section notified from the signal transfer device 2a. The estimation unit 73a may estimate that the low-priority signal communication available section notified will continue for a while in a case in which variations in high-priority traffic are relatively gradual as compared with those in the estimated cycle. Further, the estimation unit 73a may calculate and estimate how much the cycle varies based on a low-priority signal communication available section notified in the past, in a case in which high-priority traffic vary relatively fast as compared with the estimated cycle.

The cycle estimated by the estimation unit 73a may be an arbitrary value in units of seconds, minutes, hours, days, or the like. However, the low-priority signal communication available section ($B_1$) is set to have a longer cycle than the low-priority signal communication available section ($B_{2,i}$). Further, the estimation unit 73a may set the low-priority signal communication available section ($B_1$) to be slightly short in consideration of an estimation error as well.

Further, the estimation unit 73a estimates the paths for the low-priority traffic based on each statistical value in the second transmission period sent by the signal transfer device 2a to increase the number of low-priority traffic flows to be transferred during a predetermined period through the plurality of paths (path candidates) calculated by the calculation unit 71a.

Here, the estimation unit 73a estimates the paths for the low-priority traffic by changing at least either the first transmission period or the second transmission period for the paths.

Further, the estimation unit 73a may estimate the second transmission period in the plurality of paths calculated by the calculation unit 71a based on the statistical values sent by the signal transfer device 2a, determine the number of low-priority traffic flows to be accommodated, and determine or change the path for each low-priority traffic at a shorter cycle than the cycle at which the number of low-priority traffic flows is determined.

Further, the estimation unit 73a may uses a band obtained by subtracting the amount of low-priority traffic to be transmitted from a band of the second transmission period for a different best effort-type low-priority traffic flow after determining or changing each path for the low-priority traffic, and determines the path to maximize a transmission available band for the different best effort-type low-priority traffic flow, in a case in which the amount of low-priority traffic to be transmitted during a predetermined period is smaller than the amount of low-priority traffic that can be transmitted in the second transmission period estimated for each path.

The determination unit 72a determines output destination setting information for setting output destinations of the output traffic for each signal transfer device 2a based on the plurality of signal transfer paths estimated by the estimation unit 73a and outputs the output destination setting information to the communication unit 70a. The output destination setting information is used to configure a high-priority signal communication available section (first transmission period: $B_H$) in which high-priority traffic can be transmitted and a low-priority signal communication available section (second transmission period: $B_L$) in which low-priority traffic can be transmitted.

Figure 3:
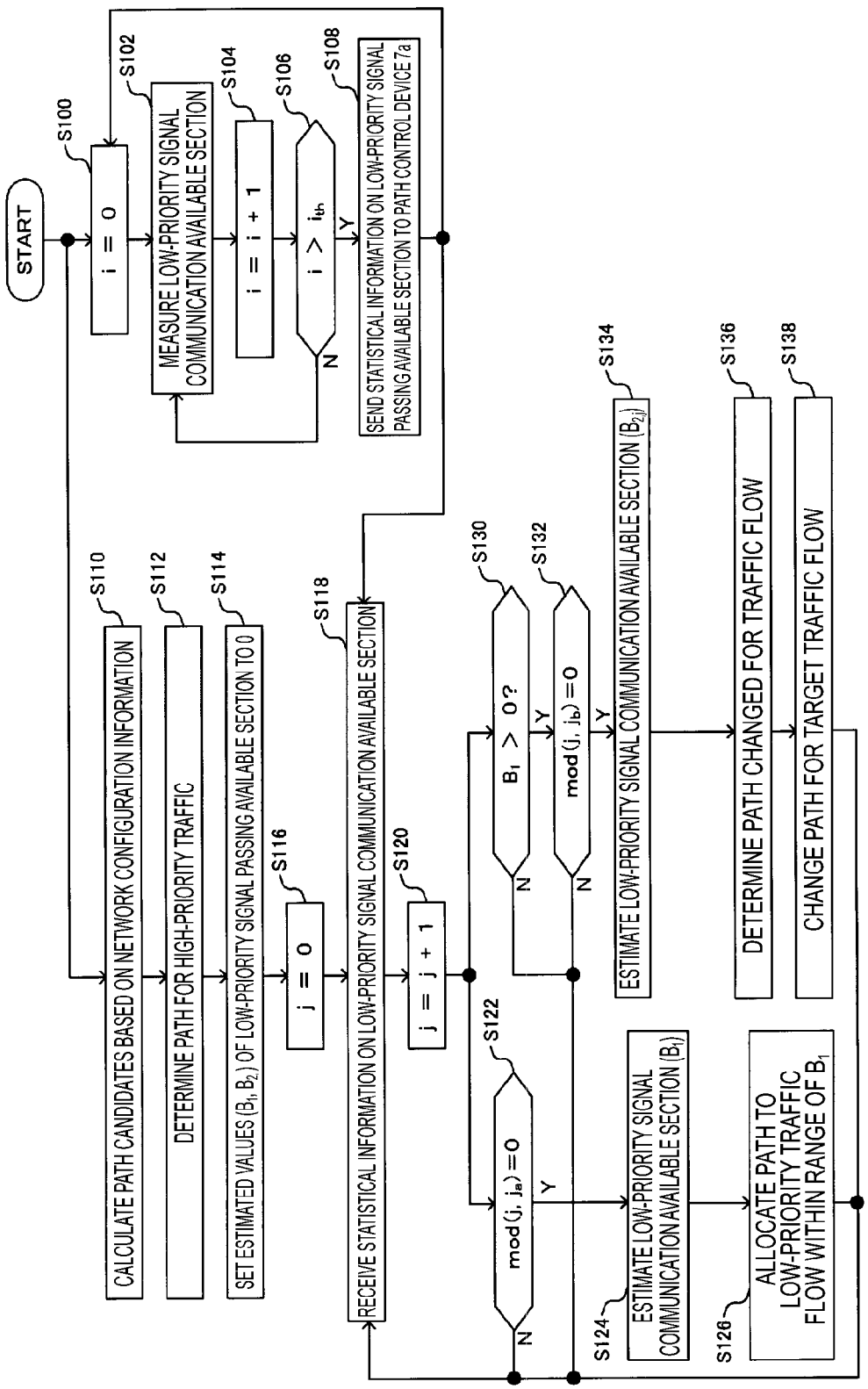
FIG. 3 is a diagram illustrating a first example of processing performed by a signal transfer system.

Next, a first example of processing performed by the signal transfer system including the signal transfer device 2a and the path control device 7a will be described. FIG. 3 is a diagram illustrating the first example of the processing performed by the signal transfer system including the signal transfer device 2a and the path control device 7a.

If low-priority signal communication available sections are measured a predetermined number of times, the signal transfer device 2a sends measured statistical information to the path control device 7a.

For example, the signal transfer device 2a measures low-priority signal communication available sections (S102) on the assumption of i=0 ($1 \leq i \leq n$, where n is the number of paths: S100), increments i (S104), and repeats the measurement until a predetermined number of times $i_{th}$ is exceeded (S106). Then, the signal transfer device 2a sends statistical information of the low-priority signal communication available sections to the path control device 7a (S108).

In the path control device 7a, the calculation unit 71a calculates path candidates based on network configuration information (S110) and determines paths for high-priority traffic (S112).

The estimation unit 73a sets an estimated value ($B_1$, $B_{2,i}$) of the low-priority signal communication available section to 0 (S114) and sets the value at a timing j in a predetermined period h to 0 (S116).

An estimated value ($B_1$) of the low-priority signal communication available section is a value used to calculate the number of low-priority traffic flows that can be accommodated. An estimated value ($B_{2,i}$) of the low-priority signal communication available section is a value used for each path to calculate the path for the low-priority traffic flow. Further, the estimated value ($B_1$) of the low-priority signal communication available section is calculated by Expression (1) below.

$$\min_{(1 \leq j \leq h)} \Sigma_{(1 \leq i \leq n)} (B_{2,i}(t_j))) \tag{1}$$

If the communication unit 70a receives the statistical information of the low-priority signal communication available section (S118), then the path control device 7a increments the timing j (S120).

The estimation unit 73a determines whether or not mod $(j, j_a)$=0 (S122), and when mod $(j, j_a)$=0 (S122: Yes), the estimation unit 73a estimates the low-priority signal communication available section ($B_1$) (S124), and performs path allocation (S126) to the low-priority traffic flow at each timing j within the range of the low-priority signal communication available section ($B_1$).

Further, in a case in which B1>0 (S130: Yes), and mod$(j, j_b)$=0, the estimation unit 73a estimates the estimated value ($B_{2,i}$) of the low-priority signal communication available section (S134).

Then, the determination unit 72a determines the path changed for the traffic flow (S136) and performs processing of changing the path for the target traffic flow by outputting output destination setting information (S138).

In this manner, the signal transfer system including the signal transfer device 2a and the path control device 7a can use the total band indicated by Expression (2) below in all the paths at each timing j by changing the paths using the statistical values (statistical information) in the second transmission period.

$$\text{Total band } \Sigma_{(1 \le i \le n)}(B_{2,i}(t_j)) \qquad (2)$$

However, the signal transfer system including the signal transfer device 2a and the path control device 7a needs to keep the total required band of the traffic flows to be accommodated within the aforementioned total band in a long period of time and thus determines the number of traffic flows to be accommodated within the range represented by Expression (1) above.

Note that the path to be changed based on $B_{2,i}(t_j)$ may be a path for any of the high-priority traffic flow and the low-priority traffic flow. Further, in the signal transfer system including the signal transfer device 2a and the path control device 7a, all the signal transfer devices 2a do not necessarily notify the path control device 7a of the low-priority signal communication available sections. In other words, the total amount of signal transmission can be reduced by any of the limited signal transfer devices 2a notifying the path control device 7a of the low-priority signal communication available sections.

Figure 4:
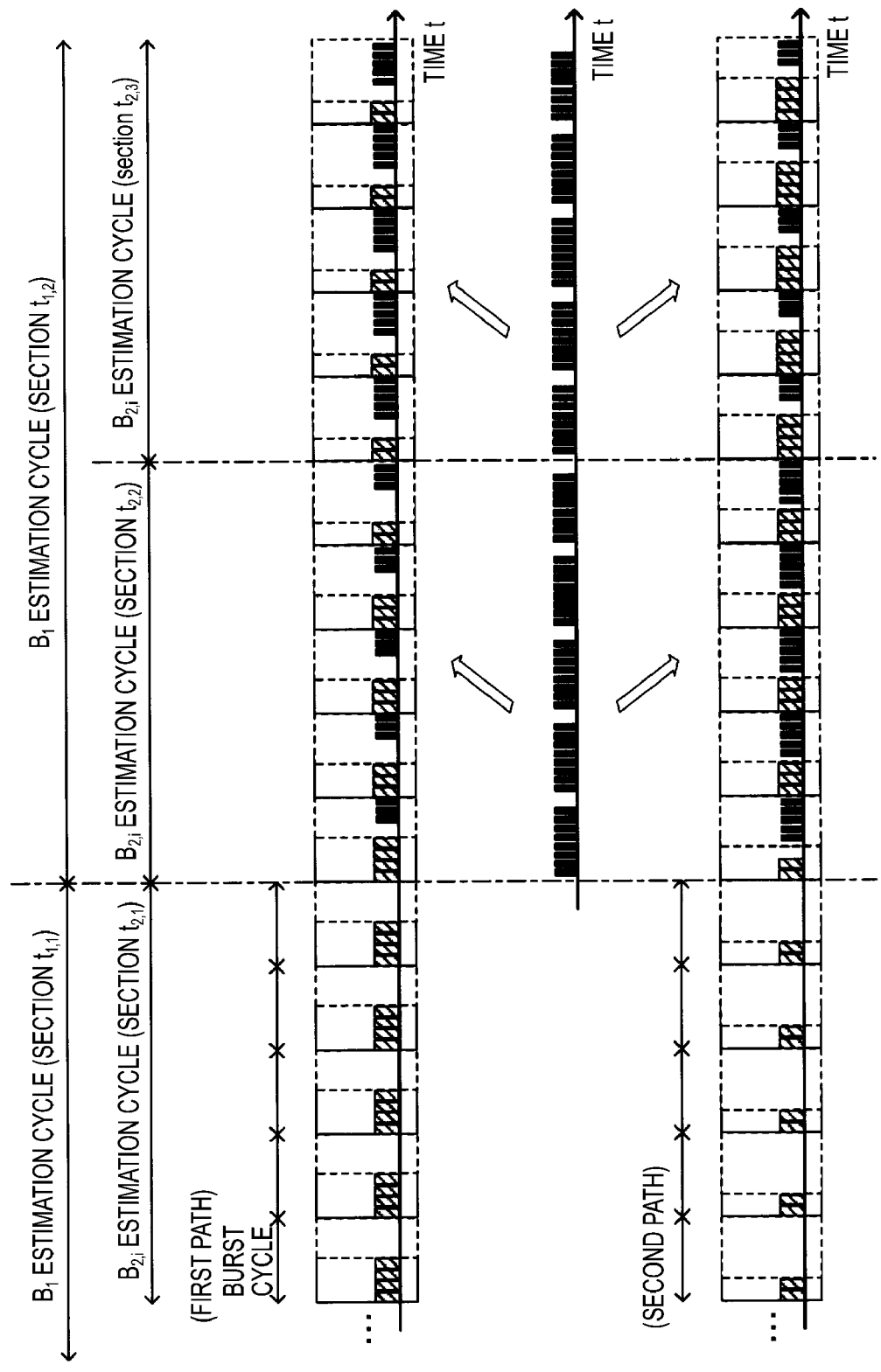
FIG. 4 is a timing chart illustrating an operation example of the signal transfer system.

FIG. 4 is a timing chart illustrating an operation example of the signal transfer system including the signal transfer device 2a and the path control device 7a. First, the path control device 7a estimates $B_1$ in the next section $t_{1,2}$ based on information indicating the low-priority signal communication available section in a section $t_{1,1}$ and calculates the low-priority traffic flows that can be accommodated.

This operation is performed to obtain the number of traffic flows that can be accommodated for a long period of time and is thus performed at a longer cycle than a path changing cycle.

After the calculation of the low-priority traffic flows that can be accommodated, the path control device 7a switches the path for the traffic flows between the sections $t_{1,2}$ such that the low-priority traffic is contained in the low-priority signal communication available section.

First, the path control device 7a calculates the path for the traffic flow in the section $t_{2,2}$ based on information indicating the low-priority signal communication available section in the section $t_{2,1}$.

For example, in a case in which $B_{2,2}(t_{2,2})$ in a second path is larger than $B_{2,1}(t_{2,2})$ in a first path, the path control device 7a allocates more low-priority traffic flows to the second path.

On the other hand, $B_{2,2}(t_{2,3})$ in the second path is smaller than $B_{2,1}(t_{2,3})$ in the first path in the section $t_{2,3}$, which is the next cycle, and the path control device 7a thus changes the path to allocate more low-priority traffic flows to the first path.

Although the path control device 7a changes the path for the low-priority traffic flows herein, the path control device 7a may change the path for the high-priority traffic flows.

Further, in a case in which a change is made from a path with a long transmission latency to a path with a short transmission latency, the frame order may typically be reversed. In this case, the low-priority wireless device 5 or the low-priority wireless control device 6 may return the frame order to the original order based on frame sequence numbers or the like similarly to the related art.

Note that the paths are changed before and after the high-priority signal communication available sections in the signal transfer system including the signal transfer device 2a and the path control device 7a, and thus the order does not reverse even if the paths are changed in a case in which a transmission latency difference is shorter than that in the high-priority signal communication available sections.

Further, the path control device 7a may use a remaining band after the processing in S136 in FIG. 3 for the other best effort-type low-priority traffic in a case in which the total traffic amount of the low-priority traffic flow to be transmitted is smaller than that in the estimated low-priority signal communication available section ($B_{2,j}$). At this time, a plurality of path determination methods are conceivable. For example, there is a method of making determination to maximize a band per best effort-type low-priority traffic flow.

In a specific example, the path control device 7a determines a path such that the number of best effort-type low-priority traffic flows to be accommodated in the first path is double the number of best effort-type low-priority traffic flows to be accommodated in the second path in a case in which the remaining band in the first path is double the remaining band in the second path.

Figure 5:
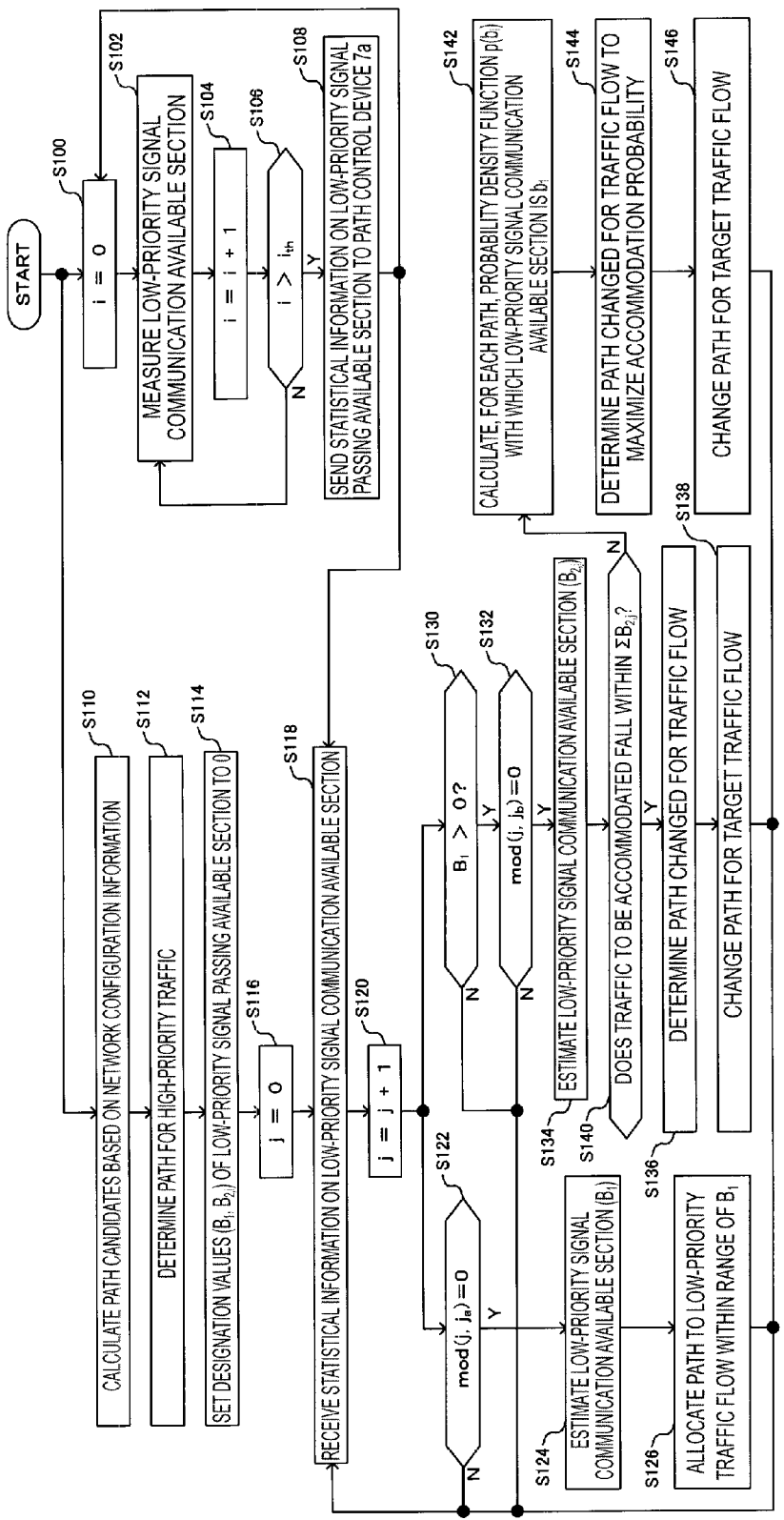
FIG. 5 is a diagram illustrating a second example of processing performed by the signal transfer system.

Next, a second example of processing performed by the signal transfer system including the signal transfer device 2a and the path control device 7a will be described. FIG. 5 is a diagram illustrating a second example of the processing performed by the signal transfer system including the signal transfer device 2a and the path control device 7a. Note that the same reference signs are applied to substantially the same processing as that in the first example illustrated in FIG. 3.

In the first example of the processing performed by the signal transfer system including the signal transfer device 2a and the path control device 7a, the case in which the total band represented by Expression (2) above does not fall below the total required band of the traffic flows to be accommodated has been described.

In the second example of the processing performed by the signal transfer system including the signal transfer device 2a and the path control device 7a, the case in which the total band represented by Expression (2) temporarily falls below the total required band of the traffic flows to be accommodated is described.

Even in the case as in the second example of the processing performed by the signal transfer system, there is a likelihood that the amount of high-priority traffic is smaller and the low-priority signal communication available section is longer than expected. The signal transfer system including the signal transfer device 2a and the path control device 7a may be configured to allocate low-priority traffic flows with expectation of such a likelihood.

As illustrated in FIG. 5, the estimation unit 73a calculates a probability density function $p(b_i)$ with which a vacant band in a low-priority signal communication available section becomes $b_i$ for each path (S142) in a case in which a total required band B of the low-priority traffic to be accommodated does not fit in $\Sigma B_{2,j}$ (Expression (2)) (S140: No).

The determination unit 72a calculates a combination of $b_i$ to maximize $p(b_1) \ p(b_2) \ldots p(b_n)$ using a condition $\Sigma_{1 \le i \le n}(b_i) \ge B$ and determines the paths for the traffic flows based on calculated $b_i$.

In this manner, the path control device 7a may calculate the probability density function with which each path corresponds to the second transmission period and determine the paths for the low-priority traffic to maximize the probability of the low-priority traffic that can be accommodated based on the probability density function in a case in which the amount of low-priority traffic to be transmitted during a predetermined period is larger than the amount of low-priority traffic that can be transmitted in the second transmission period estimated for each path by the estimation unit 73a.

Note that the calculation illustrated in FIG. 5 is an example, and the path control device 7a may simply allocate the band $(B-\Sigma_{(1 \leq i \leq n)}(B_{2,i}(t_j)))$ corresponding to the band that is not contained in the total band represented by Expression (2) above in a dispersed manner.

Although the signal transfer system with a ring-type network configuration has been described as an example in the aforementioned embodiment, the present invention is not limited thereto. For example, the signal transfer system may have another network configuration of a honeycomb type, a mesh type, or the like when two or more paths between a low-priority wireless device and a low-priority wireless control device are present in the environment.

Further, in the signal transfer system according to the embodiment, in particular, the amount of accommodated traffic for each path varies in the network, and a large effect is obtained in a case in which the total amount of accommodated traffic does not significantly vary.

For example, the amount of traffic in daytime in business districts is assumed to be large, and on the contrary, the amount of traffic in night time in residential areas are assumed to be large. In a case in which such an area is accommodated using a first path and a second path in one network, it is difficult to stably accommodate low-priority traffic flows by the scheme in the related art in which the paths are not changed based on statistical information. For example, according to the scheme in the related art, it is necessary to determine the number of traffic flows to be accommodated in accordance with a short low-priority signal communication available section in daytime for the first path and to determine the number of traffic flows to be accommodated in accordance with the a short low-priority signal communication available section in night time even for the other path that is the second path.

In the related art, there is a likelihood that accommodated flows cannot be transmitted within an allowable latency time if the paths of the low-priority traffic flows are fixed because how much the low-priority signal communication available sections are extended varies depending on time.

On the other hand, the aforementioned signal transfer system according to the embodiment can determine the number of traffic flows to be accommodated in a communication section including not only the short low-priority signal communication available section for the first path but also a long low-priority signal communication available section for the second path in day time if the estimated cycle of $B_1$ is set to about one day and the estimated cycle of $B_{2,i}$ is set to be sufficiently short. Moreover, the aforementioned signal transfer system according to the embodiment can determine the number of traffic flows to be accommodated in the communication section including not only the short low-priority signal communication available section for the second path but also a long low-priority signal communication available section for the first path even in night time.

In this manner, the aforementioned signal transfer system according to the embodiment estimates the paths for the low-priority traffic based on the statistical values in the second transmission period and can thus increase the number of flows that can be accommodated even for low-priority traffic that requires a stable and constant amount of band.

Note that a part or all of the units configuring the signal transfer device 2a and the path control device 7a described above may be configured using hardware or may be configured by causing a processor to execute a program.

Further, in a case in which a part or all of the units configuring the signal transfer device 2a and the path control device 7a are configured by causing a processor to execute the program, the program may be recorded in a recording medium and supplied or may be supplied via a network.

REFERENCE SIGNS LIST

1 Signal transfer system
2-1 to 2-7, 2a Signal transfer device
3 High-priority wireless device
4 High-priority wireless control device
5 Low-priority wireless device
6 Low-priority wireless control device
7, 7a Path control device
20 Sorting unit
21 High-priority buffer
22 Low-priority buffer
23 Output unit
24, 24a Scheduler unit
25, 25a Communication unit
26a Detection unit
27a Measurement unit
70, 70a Communication unit
71, 71a Calculation unit
72, 72a Determination unit
73a Estimation unit

The invention claimed is:

1. A signal transfer system comprising: a plurality of signal transfer devices configured to transfer a plurality of signals while switching a first transmission period during which high-priority traffic is transmitted and a second transmission period during which low-priority traffic is transmitted; and a path control device configured to control a plurality of paths through which the signals are transferred via the plurality of signal transfer devices, wherein the plurality of signal transfer devices each include: a processor; and a storage medium having computer program instructions stored thereon, when executed by the processor, perform to: detect an end of the high-priority traffic in the first transmission period; in a case in which the end of the high-priority traffic is detected, make a transmission schedule to change the first transmission period after the end of the high-priority traffic to the second transmission period; measure a statistical value in the second transmission period based on the transmission schedule; send the statistical value to the path control device; and output the low-priority traffic based on output destination setting information, and the path control device includes: a processor; and a storage medium having computer program instructions stored thereon, when executed by the processor, perform to: calculate the plurality of paths through which the signals are transferred, based on network configuration information indicating a configuration of a network to which the plurality of signal transfer devices and the path control device are connected; estimate the second transmission period in the plurality of paths, based on the statistical value sent from the signal transfer device, determine the number of low-priority traffic flow to be accommodated, and determine or change the plurality of paths for low-priority traffic at a shorter cycle than a cycle at which the number of low-priority traffic flows is determined; and determine, for each of the plurality of signal transfer devices, the output destination setting information such that the plurality of paths determined or changed are set to an output destination of low-priority traffic.

2. The signal transfer system according to claim 1, wherein the computer program instructions of the path control device further perform to, in a case in which an amount of low-priority traffic to be transmitted during a predetermined period is smaller than an amount of low-priority traffic that can be transmitted in the second transmission period estimated for each of the plurality of paths, uses, for a different best effort-type low-priority traffic flow, a band obtained by subtracting the amount of low-priority traffic to be transmitted from a band of the second transmission period, after determining or changing each path for low-priority traffic, to determine the path to maximize a transmission available band per the different best effort-type low-priority traffic flow.

3. The signal transfer system according to claim 1, wherein the computer program instructions of the path control device further perform to, in a case in which the amount of low-priority traffic to be transmitted during a predetermined period is larger than the amount of low-priority traffic that can be transmitted in the second transmission period estimated for each of the plurality of paths, calculates a probability density function with which each of the plurality of paths corresponds to the second transmission period, and determines, based on the probability density function, the path for the low-priority traffic to maximize a probability of accommodating the low-priority traffic.

4. A path control device configured to control a plurality of paths for transmitting a plurality of signals through a network including a plurality of signal transfer devices, each of which being configured to transfer the signals while switching a first transmission period during which high-priority traffic is transmitted and a second transmission period during which low-priority traffic is transmitted,
the path control device comprising:
a processor; and
a storage medium having computer program instructions stored thereon, when executed by the processor, perform to:
calculate the plurality of paths through which a plurality of signals are transferred, based on network configuration information indicating a configuration of the network;
in a case in which the signal transfer device detects an end of high-priority traffic in the first transmission period, in accordance with a statistical value in the second transmission period based on a transmission schedule made for changing the first transmission period after the end of the high-priority traffic to the second transmission period, estimate the second transmission period in the plurality of paths, determine the number of low-priority traffic flows to be accommodated, and determine or change the path for low-priority traffic at a shorter cycle than a cycle at which the number of low-priority traffic flow is determined; and
determine, for each of the plurality of signal transfer devices, output destination setting information such that the plurality of paths are set to an output destination of low-priority traffic.

5. The path control device according to claim 4, wherein the computer program instructions further perform to,
in a case in which an amount of low-priority traffic to be transmitted during a predetermined period is smaller than an amount of low-priority traffic that can be transmitted during the second transmission period estimated for each of the plurality of paths, uses, for a different best effort-type low-priority traffic flow, a band obtained by subtracting the amount of low-priority traffic to be transmitted from a band of the second transmission period, after determining or changing the plurality of paths for low-priority traffic, to determine the plurality of paths to maximize a transmission available band per the different best effort-type low-priority traffic flow.

6. The path control device according to claim 4, wherein the computer program instructions further perform to
in a case in which an amount of low-priority traffic to be transmitted during a predetermined period is larger than an amount of low-priority traffic that can be transmitted during the second transmission period estimated for each of the plurality of paths, calculates a probability density function with which each of the plurality of paths corresponds to the second transmission period, and determines the plurality of paths for low-priority traffic based on the probability density function to maximize a probability of accommodating the low-priority traffic.

7. A signal transfer method performed by a signal transfer system,
the signal transfer system comprising:
a plurality of signal transfer devices configured to transfer a plurality of signals while switching a first transmission period during which high-priority traffic is transmitted and a second transmission period during which low-priority traffic is transmitted; and
a path control device configured to control a plurality of paths that transfer the plurality of signals via the plurality of signal transfer devices, wherein
the method comprises:
detecting an end of high-priority traffic in the first transmission period;
in a case in which the end of high-priority traffic is detected, making a transmission schedule to change the first transmission period after the end of high-priority traffic to the second transmission period;
measuring a statistical value in the second transmission period based on the transmission schedule;
calculating the plurality of paths through which the signals are transferred, based on network configuration information indicating a configuration of a network to which the plurality of signal transfer devices and the path control device are connected;
estimating the second transmission period in the plurality of paths calculated, based on the statistical value sent from the plurality of signal transfer devices, determining the number of low-priority traffic flows to be accommodated, and determining or changing the plurality of paths for low-priority traffic at a shorter cycle than a cycle at which the number of low-priority traffic flows is determined;
determining, for each of the plurality of signal transfer devices, output destination setting information such that the plurality of paths estimated are set to an output destination of low-priority traffic; and
outputting low-priority traffic based on the output destination setting information.

8. The signal transfer method according to claim 7, wherein,
in a case in which an amount of low-priority traffic to be transmitted during a predetermined period is smaller than an amount of low-priority traffic that can be transmitted during the second transmission period estimated for each of the plurality of paths, the estimating includes:
using, for a different best effort-type low-priority traffic flow, a band obtained by subtracting an amount of low-priority traffic to be transmitted from a band of the second transmission period, after determining or changing the plurality of paths for low-priority traffic; and determining the plurality of paths to maximize a transmission available band per the different best effort-type low-priority traffic flow, and in a case in which the amount of low-priority traffic to be transmitted during a predetermined period is larger than the amount of low-priority traffic that can be transmitted during the second transmission period estimated for each of the plurality of paths, the estimating:

calculating a probability density function with which each of the plurality of paths corresponds to the second transmission period; and determining the plurality of paths for low-priority traffic based on the probability density function to maximize a probability of accommodating the low-priority traffic.

* * * * *